United States Patent Office 3,312,558
Patented Apr. 4, 1967

3,312,558
CALCIUM HEXALUMINATE ARTICLES
Eldon D. Miller, Jr., 103 Marble Drive,
Bridgeville, Pa. 15017
No Drawing. Filed May 17, 1966, Ser. No. 550,602
5 Claims. (Cl. 106—63)

This invention relates to compositions of the calcium aluminate type, methods of manufacture thereof, and products and articles made therefrom. More particularly, the invention relates to stable calcium hexaluminate ($CaO \cdot 6Al_2O_3$), methods of making it, and products and articles made therefrom. This application is a continuation-in-part of application Serial No. 335,667, entitled, "Calcium Aluminate Refractory," filed Jan. 3, 1964, and now U.S. Patent No. 3,269,848.

Those skilled in the art to which this invention relates were long divided as to the certainty of the very existence of calcium hexaluminate. Many workers were convinced of its existence, but expressed doubts as to its stability.

I have discovered a commercial process for economically producing calcium hexaluminate, which requires less than about 12 hours of heat treatment. I have also, discovered many distinctive and surprising uses for the material, including its use as a catalyst carrier, as refractory insulation of various physical forms, for fabrication of a variety of different types of molds, and as filtering media.

It is an object of this invention to provide a calcium hexaluminate material having good capillarity. It is another object of this invention to provide a process for producing calcium hexaluminate having good capillarity. Yet another object of the invention is to provide a novel catalyst carrier produced of calcium hexaluminate. It is yet another object of the invention to provide a novel porous mold material suitable for use in slip casting. Another object of the invention is to provide novel filtering media. Yet another object of the invention is to provide a method of fabricating ceramic filter media including provision for variation of porosity, pore size, and capillarity for use in filtering such as solids from gases, liquids, etc.

Briefly, according to one aspect of this invention, stable, high purity, calcium hexaluminate shapes having good capillarity are fabricated as follows: A batch is formed comprising 100 parts, by weight, of a mixture of ingredients, which yields alpha alumina and calcium oxide at temperatures below about 2000° F., is intermixed in the proportions arranged to yield, on an oxide analysis, about $6Al_2O_3$ and $1CaO$, i.e., a 6 to 1 molar ratio. The good capillarity is an inherent quality of the material of this invention. The material selected must yield the $Al_2O_3$ and CaO in the form of particles which are substantially all finer than 150 mesh Tyler, with the major proportion thereof (over 50%) passing through a 325 mesh screen. In fact, though, I prefer that substantially all the particles be finer than 325 mesh. These fine particles must be intimately mixed or blended with each other. The resulting mixture may be formed to a desired product shape. These ingredients are then mixed with about 6 to 50 parts, by weight, of water. Minus 28 mesh burnout material can be added at this point. The total amount of burnout material and water determine the final porosity of the calcium hexaluminate shapes. Shapes are fired to a temperature above about 2100° F., preferably above 2700° F.; but, in no event to 3300° F. and, preferably, no more than about 3000° F. Firing is continued until equilibrium conditions exist (i.e., substantially no further chemical reaction occurs between ingredients), and in which substantially all of the $Al_2O_3$ and CaO have reacted to form $CaO \cdot 6Al_2O_3$ with up to 1% (or even 5% in special cases as discussed later), by weight, of materials of the group $CaO \cdot 2Al_2O_3$ and $Al_2O_3$. I have found about 10 hours to be very satisfactory at a temperature in the range 2700 to 3000° F.

A preferred and exemplary mixture of dry ingredients is as follows:

(1) 15.0% $CaCO_3$ and 85.0% alpha alumina
(2) 19.2% $CaSO_4 \cdot \frac{1}{2}H_2O$ and 80.8% alpha alumina
(3) 10.8% $Ca(OH)_2$ and 89.2% alpha alumina Each of these three mixtures, on a calcined basis (calculated), is equivalent to about 91.6% alpha alumina ($Al_2O_3$ and 8.4% calcia (CaO). I prefer that all dry ingredients be less than about 325 mesh.

The resulting shapes, according to this invention, are ceramically bonded bodies consisting essentially of stable calcium hexaluminate and up to about 5%, by weight, of corundum and calcium dialuminate. The shapes are microscopically characterized as a mass of randomly orientated hexagonal plates substantially free of vitrified phases. The shapes have a porosity in the range of 15 to 70% and good capillarity.

By capillarity, I mean having minute tubes or interspaces whereby water is drawn thereinto by surface tension. By good capillarity, I mean capillarity equivalent to or better than that of gypsum plaster molds.

I consider the physical character of articles according to this invention to be surprising, for several reasons. First, I know of few other high porosity shapes fabricated from all fine materials that do not shrink and crack excessively during burning. Second, the good capillarity, i.e., having minute tubes and interspaces, is indeed unusual. It is thought a result of the random network of calcium hexaluminate crystals.

The following specific examples and detailed discussion are provided to acquaint those skilled in the art with the best modes now known to me for the practice of my invention, and are not intended as limiting. Rather, I intend that the true spirit and scope of my invention be as defined in the hereafter appended claims.

EXAMPLE I

According to this invention, several different types of molds can be made of calcium hexaluminate, which molds have superior characteristics, as compared to comparable precursors. Strong, relatively lightweight, and extremely porous crystalline bodies made up of grains, characterized as a mass of randomly-oriented hexagonal plates having good capillarity, can be made according to this invention, which are particularly suitable for molds for the slip casting of ceramic objects. It is preferable that the green mold bodies be burned at a temperature between 2000 and 2700° F. There is a slight expanding reaction when the material is burned in this temperature range. Virtual absence of melt is important to a capillary-type porous molding media, which is what is desired for the slip casting of ceramic objects. (An example of a precursor mold is gypsum plaster, which is an intergrowth of needle-like crystals of crystallites.)

The slight expansion, upon firing, is considered providential, because it counteracts the normal shrinkage of the fine-ground plastic ceramic masses previously used to make these types of molds when formed from soft workable masses (containing relatively large quantities of water, 20 to 50%, based on the dry solids). The result of the expanding reaction is a subsequent volume stability which is believed unique to the refractory art. The result is a high-strength fired mold for slip casting. Another interesting aspect of the use of the fired material of this invention for molds for use in slip casting is that it is nonhydraulic. By "nonhydraulic," I mean it does not take on water of crystallization as do practically all other calcium aluminate compositions.

Molds are made, for example, by mixing alpha alumina and calcia-yielding ingredients in the molar ratio noted, with about 40 to 50% water to form a slurry and pouring the slurry about a master pattern. A green shape is recovered and fired. A preferred mixture of dry ingredients is 19.2 parts $CaSO_4 \cdot \frac{1}{2} H_2O$ and 80.8 parts Bayer process alpha alumina.

The molds, just discussed, for use in slip casting of ceramic materials are not subject to chemical reaction with the ceramic materials normally used in slip-cast mixes (such as acids or basic sodium carbonates and sodium silicates), nor to bothersome mildew, banding, and other problems inherent in plaster molds.

The uses of molds made of the calcium hexaluminate material of this invention are excellent for slip-casting of powdered metals. Previous problems, occurring when using plaster molds with metal slips, in great part involve lack of mold release due to absence of shrinkage of "green" slip-cast made from powdered metals. The calcium hexaluminate-type molds of this invention can be fired and then used to cast the object (either solid or drain-casting techniques can be used) and in some cases the mold and casting can be heat-treated together (at temperatures, of course, which are below that of the metal and mold reaction point). This heat treatment causes shrinkage of the powdered metal shape, thereby facilitating removal from the mold. In certain cases, it is even possible to sinter the castings fully in the mold without removing them, depending on the shape and on the sintering temperature which must be used to make a sintered metal product.

EXAMPLE II

Dry materials, preferably nonclay-like or nonplastic in the rheological sense (i.e., similar to a cold water and starch mixture or wet sand) are dispersed with an electrolyte and water, but insufficient water is added to cause a paste or continuous suspension to form. The calcium hexaluminate-forming ingredients already described are added. This mass is agitated in a noncrushing-type mixer, such as a Hobart planetary food mixer or a Lancaster mixer, with the muller wheel raised. By control of the amount of moisture, spheres or ball-shaped particles can be formed of about ½" diameter and finer, with 90% or more being at least as large as ¼" in diameter.

In general, it may be said that catalyst carrier media of this invention consist of a preponderance of calcium hexaluminate (i.e., preferably 90% or more). The carrier is strong, highly refractory, of high porosity and of low density.

A plastic mass was formed by mixing together about 10% (10.8% preferably) of calcium hydroxide and 90% (89.2% preferably) of alpha alumina (of course, as noted elsewhere, all material is −325 mesh), tempered with about 45% of water (dry basis). Then, balls were formed from the resulting plastic mass. The balls were dried at 230° F. for about 5 hours, heated at about 500° F. per hour to 2500° F., which temperature was held for about 5 hours. The balls were so strong they could be bounced on a concrete floor from a height of about 5 feet without breaking. They had a porosity of about 55%, i.e., 55% of the volume of the balls was void. The bulk density was about 114 p.c.f. Higher temperatures, i.e., up to about 3200° F., will increase the strength, but decrease the porosity, however, because the reaction to form calcium hexaluminate has been found to be an expanding one and larger crystals occur as the heat treatment is made more severe. No glassy bonds were determined observing a cut section under a microscope.

EXAMPLE III

The high porosity, good strength, chemical inertness to many materials, and good capillarity makes calcium hexaluminate according to this invention useful as a ceramic filter. Porosity, pore size, and capillarity are variable within wide limits, simply by altering starting materials, selection of burning temperature, water content (the higher the water content, the higher the porosity), use of burnout materials of carefully sized dimensions, etc. The filters will withstand temperatures up to about 2800° or 3000° F. They are satisfactory for separation of solids from liquids in high temperature streams. They are satisfactory for separation of solids from gases. They can be used as filters for petroleum streams to remove sediment.

Generally speaking, the calcium hexaluminate material of this invention can be characterized as being essentially free of glassy or vitrified phases, or as being finely crystalline, and as being made up of a mass of small hexagonal plates. Porosity is variable, depending on burnout materials, amount of water, etc., as discussed above, but it is possible to obtain a strong fired body which has from about 50 to about 70% voids (by volume). The bulk density will vary on the order of 60 to 70 p.c.f. The permeability has not been specifically measured but, in comparison with plaster of the type used for making molds, it has much higher permeability as compared to plaster molds of the same or comparable density. As to strength, I have noted that fired balls made of the calcium hexaluminate of this invention can be dropped on a concrete floor without breaking.

EXAMPLE IV

Another interesting and unexpected aspect of calcium hexaluminate manufacture, according to this invention, is the predictable and controllable expansion and shrinkage which may be obtained by addition of minor amounts of selected ingredients. For example, using Bayer process calcined alpha alumina of 99.6% purity and calcia-yielding raw materials of equal purity in the proportions mentioned in Example I, above, an addition of 1% of −325 mesh ball clay produces on firing a reproducible 10% linear shrinkage of the resulting shape. In such a case it is preferred that the alumina be slightly in excess of that required to just react with the calcia present to form the calcium hexaluminate. By slightly in excess, I mean on the order of about 1 to 2%. A 1% addition of a colloidal silica to similar ingredients (instead of the ball clay) likewise produces a reproducible substantially 10% linear shrinkage. Extremely small amounts of titania, i.e., on the order of about 0.2%, caused reproducible linear shrinkage when added to the same ingredients; for example, on the order of 1.0%.

One of the most important process parameters in the fabrication of calcium hexaluminate and products thereof is that the firing temperature cannot be over 3300° F. and in fact, should be less than 3200° F., preferably no more than about 3000° F. but above 2700° F.

Since different porosities are suitable for different applications of porous calcium hexaluminate, it is desirable to be able to calculate the amount of burnout material and water that must be added to a dry batch according to this invention to provide an approximate desired porosity. This can be done with the use of a well known formula. The "standard definition of terms relating to refractories," given in the Manual of ASTM Standards on Refractory Materials, 1963 edition, at page 400, is as follows:

"Porosity—the percentage of the total volume of a material occupied by open and closed pores."

Since there is very little volume change on burning batches not containing clay but according to this invention, the approximate expected porosity can be calculated from the batch according to the following formula:

$$P = \frac{V_w V_{rs}}{V_w + V_{rs} + V_s} \times 100$$

where:

$P$ = Porosity.
$V_w$ = Volume of water added to the batch.
$V_{rs}$ = Volume of removable solids in the batch which includes burnout materials and chemical water and sulfate or carbonate radicals.
$V_s$ is equal to the volume of the solids which remain after burning.

Except where there is burnout material added, the only removable solids are the sulfate and carbonate radicals attached to the lime source where they are added in the form of sulfates or carbonates and, of course, chemical water. For approximate calculations, these can be ignored. So, where no burnout material is added, the approximate formula becomes:

$$P = \frac{V_w}{V_w + V_s} \times 100$$

Since the volume of any material can be written as its weight divided by its density, the formula becomes:

$$P = \frac{\frac{W_w}{D_w}}{\frac{W_w}{D_w} + \frac{W_s}{D_s}} \times 100$$

where:

$D$ = density
$W$ = weight

Rearranging:

$$W_w = \frac{P/100 W_s}{(1 - P/100)} \times \frac{D_w}{D_s}$$

The value of $D_w/D_s$ is very difficult to predict theoretically. However, it can be determined by using the empirical data given in Example II of this specification, where 45 parts of water were added to 100 parts of batch and a porosity of 55% was obtained. Substituting these in the formula, the value of $D_w/D_s$ is calculated to be 0.37.

Finally, the formula for approximating the water content to obtain a given porosity in articles according to this invention can be written:

$$W_w = \frac{P/100 W_s}{(1 - P/100)} \times .37$$

This formula can also be used to calculate the approximate porosities given the water additions. Since this invention contemplates the addition of 8 to 50 parts water, the range of porosities expected without the addition of burnout material is about 15 to 57%. Up to 70% porosity can be obtained by the addition of burnout material, as disclosed in Example III.

Mineralogic examination using the X-ray will reveal that my fired compositions contain little other than calcium hexaluminate. The minor phases are likely to be corundum ($Al_2O_3$) or calcium dialuminate, depending on whether the departure from equilibrium (from the 6:1 $Al_2O_3$:CaO molar composition) is on the high alumina or low alumina side of the hexaluminate. Usually I would prefer that no more than 5% total of these minor phases be present.

In the foregoing discussions, I have mentioned purity of ingredients in a general manner. It should be understood that high purity, at least reagent grade, dry ingredients are called for. Impurities cause shrinkage or expansion. As noted, up to 1% of some ingredients can be added if one wants shrinkage. Thus, as a general rule, I would hold that no more than 1%, by weight, of the batch ingredients above about 2000° F. can be other than calcia and alpha alumina. Preferably, other materials are present in trace amounts only; for example, less than 0.5% and, preferably, 0.1%, by weight. When other ingredients constitute large proportions of starting materials, complete conversion to calcium hexaluminate does not occur. For example, if one used a commercial grade bauxite and a calcia-yielding material, in proportions to obtain the necessary 6:1 molar ratio of $Al_2O_3$ and CaO, such mineral complexes as calcium aluminum silicates, titanates, ferrites, etc., preferentially would begin to occur, thereby excluding the formation of a volume stable material predominantly composed of calcium hexaluminate.

Having thus described the invention in detail and with sufficient particularity as to enable those skilled in the art to practice it, what is desired to have protected by Letters Patent is set forth in the following claims.

I claim:

1. That method of making articles of stable calcium hexaluminate material comprising forming a mixture of 100 parts, by weight, of dry materials which yield alpha alumina and calcia on about a 6 to 1 molar oxide basis at a temperature below 2000° F. and in the form of intimately admixed particles substantially all of which are −150 mesh with the major portion thereof being finer than 325 mesh, said materials at 2000° F. analyzing at least about 99% $Al_2O_3$+CaO, by weight, on an oxide basis, and up to 30 parts, by weight, of −28 mesh burnout material, mixing said dry ingredients with about 6 to 50 parts, by weight, of water, forming the resulting wet mixture into self-sustaining shapes, firing said shapes to a temperature in the range 2100 to no more than 3300° F., maintaining said temperature until equilibrium conditions exist such that said calcium hexaluminate material is microscopically characterized as a mass of randomly orientated hexagonal plates substantially free of vitrified phases and has a porosity between about 15 and 70% and good capillarity.

2. The method of claim 1 in which the calcia is derived from a material selected from the group consisting of $CaCO_3$, $CaSO_4 \cdot \frac{1}{2}H_2O$, and $Ca(OH)_2$.

3. The method of claim 1 in which the alpha alumina and calcia-yielding ingredients mixture is selected from the group consisting of mixtures:
    (A) 15.0% $CaCO_3$ and 85.0% alpha alumina,
    (B) 19.2% $CaSO_4 \cdot \frac{1}{2}H_2O$ and 80.8% alpha alumina,
    (C) 10.8% $Ca(OH)_2$ and 89.2% alpha alumina,
all percentages by weight.

4. A method according to claim 1 in which the dry ingredients are mixed with from 20–50 parts, by weight, of water, and sufficient burnout material such that said shapes have a porosity between about 50 and 70%, whereby said shapes are useful as molds and filter media and catalyst carriers.

5. A method of making calcium hexaluminate articles according to claim 1 in which up to about 1% of a material selected from the group consisting of −325 mesh ball clay, colloidal silica, and titania is added to the mixture.

References Cited by the Examiner

Gentile et al.: Calcium Hexaluminate and Its Stability Relations in the System CaO—$Al_2O_3$—$SiO_2$, J. Am. Cer. Soc., vol. 46, No. 2, February 1963, pages 74–76.

TOBIAS E. LEVOW, *Primary Examiner.*

HELEN M. McCARTHY, *Examiner.*

J. E. POER, *Assistant Examiner.*